United States Patent Office 2,998,848
Patented Sept. 5, 1961

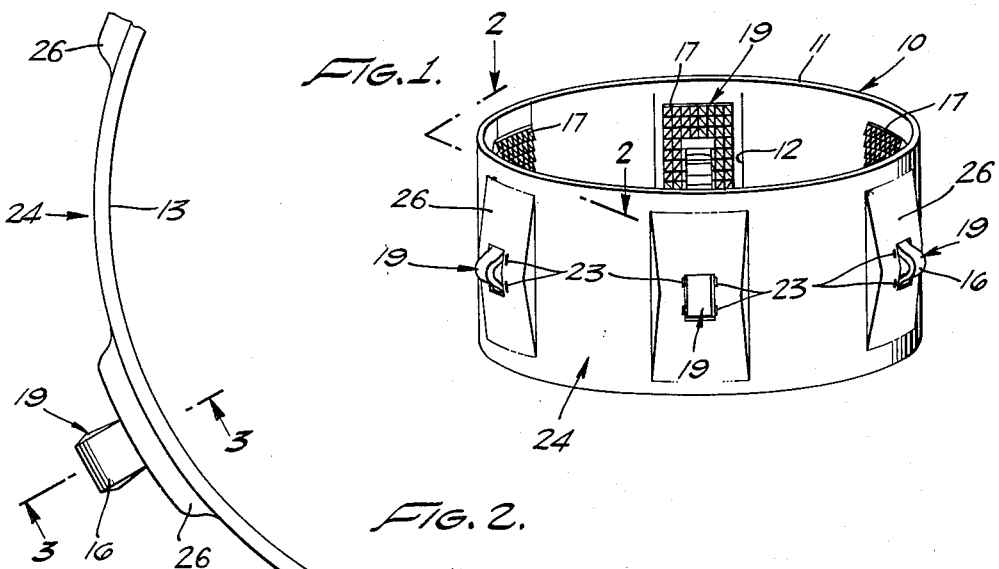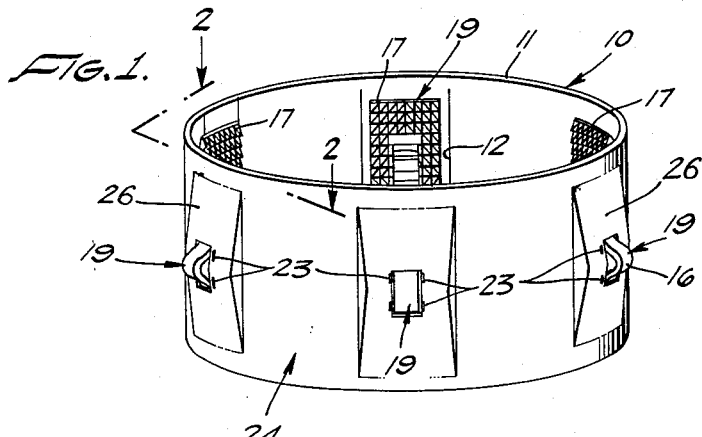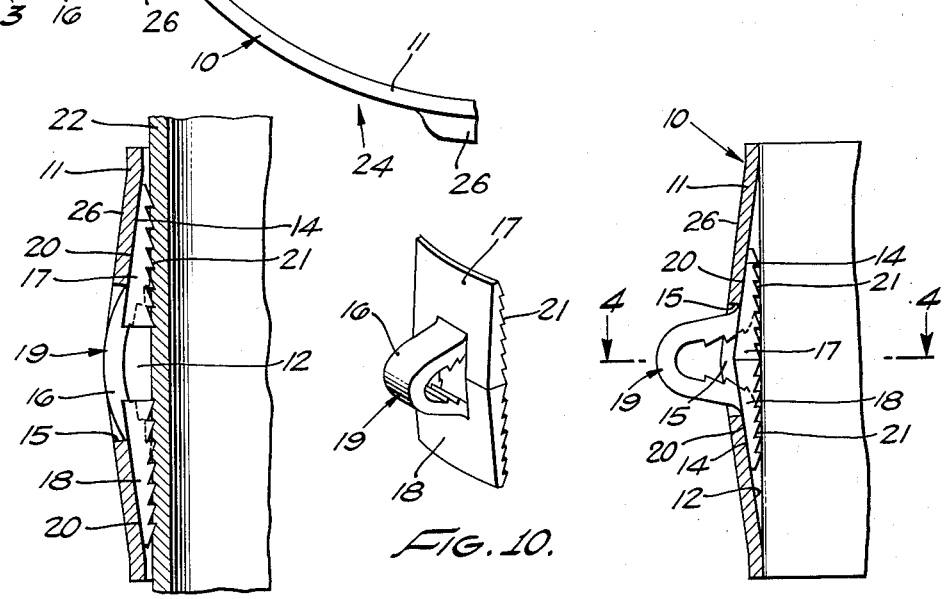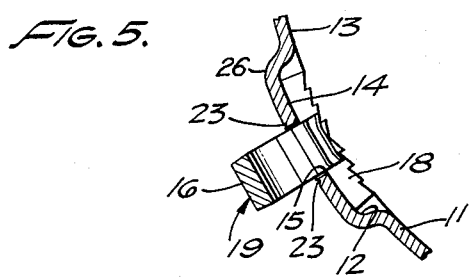

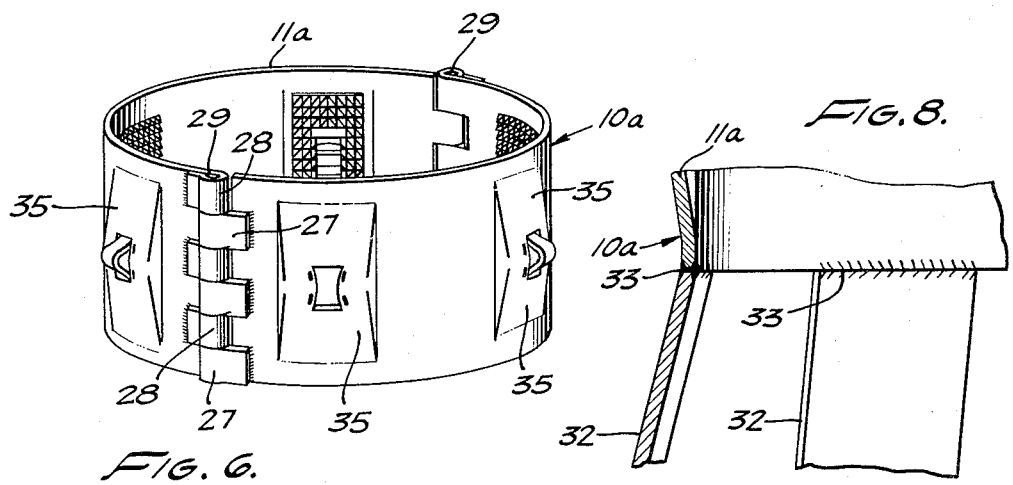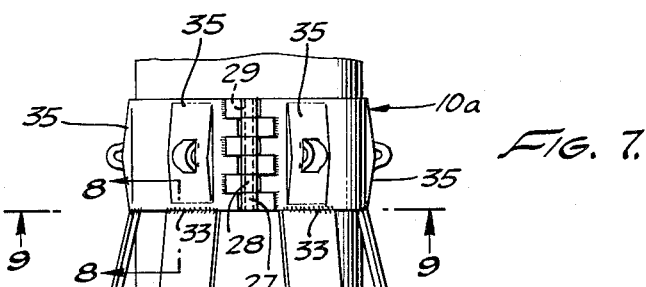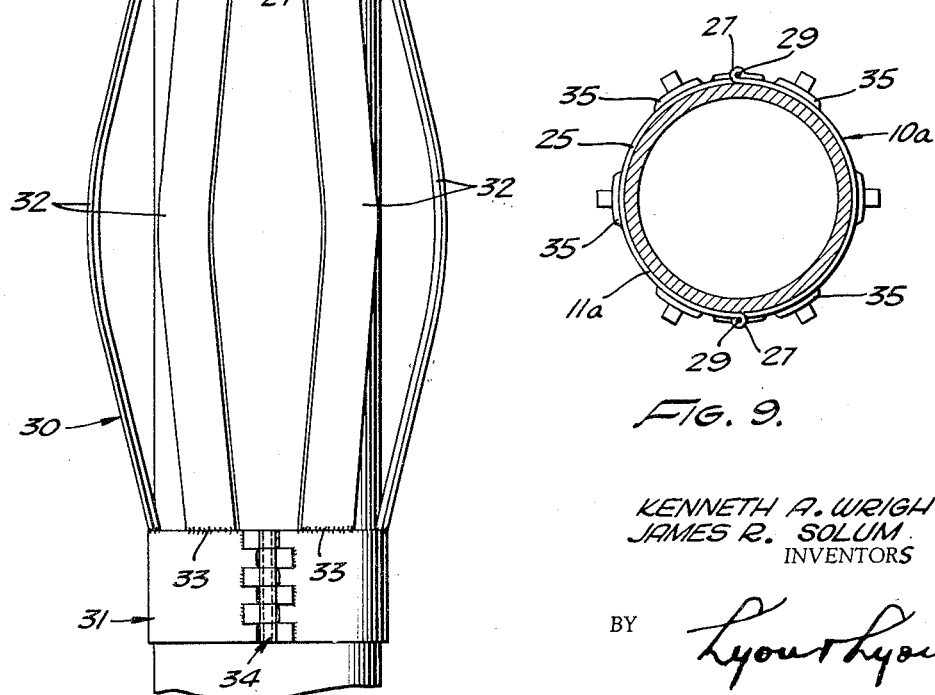

2,998,848
STOP COLLAR
Kenneth A. Wright and James R. Solum, Los Angeles, Calif., assignors, by mesne assignments, to B and W, Incorporated, Torrance, Calif., a corporation of California
Filed Nov. 4, 1957, Ser. No. 694,263
8 Claims. (Cl. 166—241)

This invention relates to the art of drilling wells and producing fluid therefrom and is particularly directed to an improved form of stop collar for use with casing or other well pipes. This invention relates to improvements over the invention disclosed in our copending application Serial No. 550,597, now Patent No. 2,872,226 filed December 2, 1955 for Stop Collar For a Well Pipe.

Present day alloy steel casing and other well pipes cannot readily be welded in the field because of possible damage to the pipe. Accordingly, when it is desirable for any reason to mount a stop collar on the outer surface of the casing or other well pipe, the stop collar must be anchored in place by means other than welding. Moreover, it is often important that the radial thickness of the stop collar assembly be held to absolute minimum and that passage area outside the casing or other pipe be restricted as little as possible. The problem is complicated by the fact that commercial mill tolerances on casing and other well pipes permits considerable variation in outside diameter of the pipe.

In accordance with our invention, we provide a stop collar assembly which requires no welding on the pipe, which has minimum radial thickness and presents a minimum of obstruction to passage of fluids outside the well casing or other pipe, and which will accommodate variations in outside diameter of the pipe.

In accordance with our invention, we provide an annular collar having a series of circumferentially spaced pockets formed in the inner surface thereof. Pairs of wedge elements are mounted in each of the pockets and an integral looped strap or web connects each pair of wedge elements. Each web projects radially through a centrally disposed window in the pocket. A hammer or similar instrument is used to deliver a series of blows radially to each of the webs and this action serves to separate the wedge elements and move them along inclined surfaces in the pockets into pipe gripping position. The outside surface of the collar between the pocket locations is cylindrical and hence offers a minimum of resistance to the passage of fluid within the well and outside the annular collar. Other objects and advantages will appear hereinafter.

In the drawings:

FIGURE 1 is a perspective view showing a preferred embodiment of our invention.

FIGURE 2 is a plan view partly broken away taken substantially on the lines 2—2 as shown in FIGURE 1.

FIGURE 3 is a sectional side elevation taken substantially on the lines 3—3 as shown in FIGURE 2.

FIGURE 4 is a sectional plan view taken substantially on lines 4—4 as shown in FIGURE 3.

FIGURE 5 is a sectional view similar to FIGURE 3 showing the wedge elements in pipe-gripping position.

FIGURE 6 is a perspective view similar to FIGURE 1 showing a modification.

FIGURE 7 is a side elevation showing another modification.

FIGURE 8 is a sectional elevation taken substantially on the lines 8—8 as shown in FIGURE 7.

FIGURE 9 is a sectional detail taken substantially on the lines 9—9 as shown in FIGURE 7.

FIGURE 10 is a perspective view of one of the wedge elements.

Referring to the drawings, the annular stop collar assembly 10 includes an annular collar 11 having a plurality of circumferentially spaced pockets 12 provided on the inner surface 13 thereof. The material comprising the collar is substantially uniform in thickness, therefore in forming the internal pockets 12 the external ribs 26 are also formed. The pockets 12 are identical and each reaches its maximum radial depth at a location midway between the upper and lower ends of the collar. Each pocket is formed by pairs of flat tapering surfaces 14 which merge with the cylindrical inner periphery 13 of the collar 11 at locations near the upper and lower ends of the collar.

Each pocket 12 is provided with a central axially extending window opening 15. An offset web 16 projecting radially outwardly from the opposed wedge elements 17 and 18 is received within the pocket 12. The wedge elements 17 and 18 and the connecting web 16 comprise a double wedge member generally designated 19 and this member is substantially the same as that shown and described in our copending application entitled Stop Collar For a Well Pipe filed December 2, 1955, Serial No. 550,597, now Patent No. 2,872,226. Each of the wedge elements 17 and 18 is provided with a rear taper surface 20 adapted to engage the corresponding pocket surfaces 14. Each wedge element 17 and 18 is also provided with a serrated surface 21 for engagement with the outer surface of a well pipe 22.

The double wedge members 19 are initially held in position within the pockets 12 by means of staking indentations 23 applied to the outer surface of the collar 10 adjacent the window opening 15.

In use, the stop collar assembly 10 is slipped over the end of a well pipe and moved along the length thereof to the desired location. A hammer or similar tool is then used to apply radial blows to the projecting portions of the web 16 thereby driving the wedge elements 17 and 18 longitudinally in opposite directions from the retracted position shown in FIGURE 3 to the pipe-engaging position shown in FIGURE 5. The stop collar assembly 10 is then rigidly fixed to the outer surface of the pipe 22. When thus fixed in position, radial thickness of the assembly 10 remains at a minimum and flow channels 24 for fluid are defined in the circumferential space outside the annular collar 11 and between each pair of ribs 26. The stop collar assembly 10 thus forms only a minimum obstruction to flow of fluid outside the well pipe 22.

In the modified form of our invention shown in FIGURE 6, the stop collar assembly 10a is substantially the same as that previously described except that the collar 11a is formed in two semi-circular parts connected by separable hinge elements 27 and 28, and hinge pins 29. In this form of our invention, the stop collar assembly 10a may be applied laterally to a well pipe by withdrawing one of the hinge pins to permit the semi-circular parts to be swung open to encompass the pipe. The hinge pin is then replaced and the wedge elements are moved into pipe-gripping position in the manner described above.

In the modified form of our invention shown in FIGURES 7, 8 and 9, the stop collar assembly 10a is employed as one of the axially spaced collars. The centralizer generally designated 30 includes the stop collar 10a, the plain collar 31 and a plurality of outwardly bowed leaf spring elements 32. These bow springs 32 may be welded at their ends to the adjacent ends of the collars 10a and 31, as shown at 33. The plain collar is provided with hinge assemblies 34 which are axially aligned with the hinge pins 29 on the stop collar 10a, thereby permitting the centralizer 30 to be applied laterally to the pipe.

Since the plain collar 31 is not provided with pockets or wedge members it presents a bare minimum of obstruction to fluid flow outside the well pipe. Furthermore the bow springs 32 are aligned with the external radially projecting ribs 35 which enclose the pockets and wedge elements on the stop collar 10a. The channels 25 on the outer surface of the stop collar 10a between these ribs 35 (which correspond to the channels 24 of the first described structure) are thus aligned with the spaces between the bow springs 32 and hence flow of fluid through these channels and spaces is substantially unimpeded.

Having fully described our invention, it is to be understood that we do not wish to be limited to the details herein set forth, but our application is of the full scope of the appended claims.

We claim:

1. In a collar assembly for installation upon a well pipe, the combination of: a collar of substantially uniform wall thickness having a series of circumferentially spaced pockets extending radially outwardly from the inner surface thereof the material of the collar overlying said pockets being substantially equal in thickness to the thickness of the remaining portion of the collar, each pocket having oppositely tapered internal surfaces and a window opening extending therethrough between said tapered surfaces, and a plurality of members positioned in said pockets, each member having two wedge elements connected by means protruding through each window opening, the wedge elements engaging the tapered surfaces, whereby said wedge elements may be moved away from each other along said tapered surfaces by applying a force against said protruding means and thereby anchor the collar upon the well pipe.

2. In a stop collar assembly for installation upon a well pipe, the combination of: a collar having a series of circumferentially spaced pockets extending radially outwardly from the inner surface thereof, each pocket having oppositely tapered internal surfaces and a centrally positioned window opening of lesser width than said pockets extending therethrough and symmetrically located with respect to said tapered surfaces, a plurality of members each having two wedge elements connected by a relatively narrow web protruding through each window opening, the wedge elements engaging the tapered surfaces.

3. In a stop collar assembly for installation upon a well pipe, the combination of: a collar substantially uniform in wall thickness throughout and having internally a series of circumferentially spaced pockets extending radially outwardly from the inner surface thereof, the surface of said collar externally of said pockets also extending radially outwardly to form external ribs coextensive with said pockets, the collar being substantially cylindrical at locations between the ribs to provide flow channels for fluid outside the pipe, each pocket having opposite tapered internal surfaces, each pocket also having a centrally positioned window opening of relatively narrow width extending therethrough and symmetrically located with respect to said tapered surfaces, and a plurality of members in said pockets each having two wedge elements connected by a web of relatively narrow width, each web protruding through one of said window openings.

4. In a stop collar assembly for installation upon a well pipe, the combination of: a collar having a series of circumferentially spaced pockets extending radially outwardly from the inner surface thereof, each pocket having oppositely tapered internal surfaces and a centrally positioned window opening substantially narrower than said pocket extending therethrough and symmetrically located with respect to said tapered surfaces, a plurality of members each having two wedge elements connected by an integral relatively narrow offset web, each wedge element having one portion for engaging one of the said tapered surfaces and having another portion for contacting the well pipe, said wedge elements initially extending axially in said pockets and clearing said pipe to permit sliding of said collar thereon with the offset webs disposed between said wedge elements protruding through said window openings, whereby said wedge elements may be moved away from each other along said tapered surfaces by applying a force against said offset webs, and thereby anchor the collar upon the well pipe.

5. In a device for installation upon a well pipe, the combination of: a pair of axially spaced collars connected by a series of axially extending bow springs, one of the collars being uniform in wall thickness and having a series of circumferentially spaced pockets extending radially outwardly from the inner surface thereof, and forming externally corresponding ribs, each pocket having oppositely tapered internal surfaces and a window opening extending therethrough, each bow spring being aligned with one of said ribs so that flow channels are defined outside the collar between each pair of ribs to provide a minimum obstruction to fluid flow, and wedge means in each of said pockets including actuating means protruding through the window openings for securing said collar upon a pipe.

6. In a device for installation upon a well pipe, the combination of: a pair of axially spaced collars connected by a series of axially extending bow springs, one of the collars being uniform in wall thickness and having a series of circumferentially spaced pockets extending radially outwardly from the inner surface thereof and forming externally corresponding ribs, each pocket having oppositely tapered internal surfaces and a window opening extending therethrough, each bow spring being aligned with one of said ribs so that flow channels are defined outside the collar between each pair of ribs to provide a minimum obstruction to fluid flow, a plurality of members in said pockets each having two wedge elements connected by a web, the webs protruding through said window openings.

7. A collar assembly for installation on well pipes, comprising: a cylindrical collar member having relatively thin walls, the material of the collar member extending outwardly to form externally a plurality of spaced ribs defining therebetween a plurality of flow channels, said ribs forming interiorly a plurality of shallow pockets, each having opposed axially tapering surfaces and a window opening extending therethrough; opposed wedge elements within said pockets initially approximately filling said pockets and conforming thereto; and means initially extending through said window opening for translating said wedge elements away from each other without distortion to lock said collar to a pipe extending therethrough.

8. Means for installation upon a well pipe, comprising: a pair of axially spaced collar members having relatively thin walls; a plurality of axially extending bow springs connecting said collar members; the material of at least one of said collar members extending outwardly to form externally a plurality of ribs in alignment with said bow springs, said ribs and bow springs forming flow channels therebetween, said ribs forming interiorly a plurality of shallow pockets, each having opposed axially tapering surfaces and a window opening extending therethrough; opposed wedge elements within said pockets initially approximately filling said pockets and conforming thereto; and means initially extending through the said window opening for translating said wedge elements away from each other without appreciable distortion to lock said collars and connecting bow springs onto a pipe extending therethrough.

References Cited in the file of this patent

UNITED STATES PATENTS

| 465,202 | Preston | Dec. 15, 1891 |
|---|---|---|
| 1,812,945 | Granger | July 7, 1931 |
| 1,997,649 | Ohlund | Apr. 16, 1935 |
| 2,368,737 | Badgley | Feb. 6, 1945 |
| 2,628,682 | Wright | Feb. 17, 1953 |
| 2,812,200 | Yeargan | Nov. 5, 1957 |